J. W. TUTTLE.
PEA GRADER.
APPLICATION FILED DEC. 29, 1914.
1,147,283.
Patented July 20, 1915.
5 SHEETS—SHEET 4.
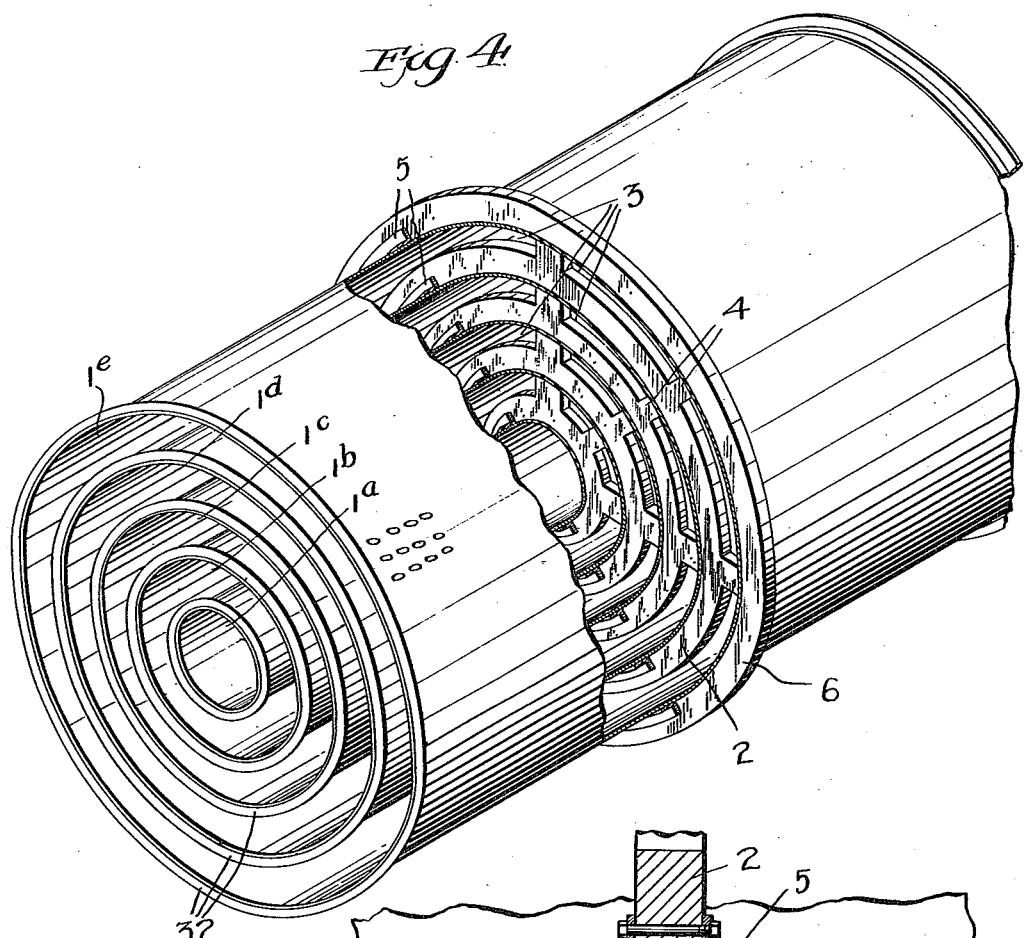
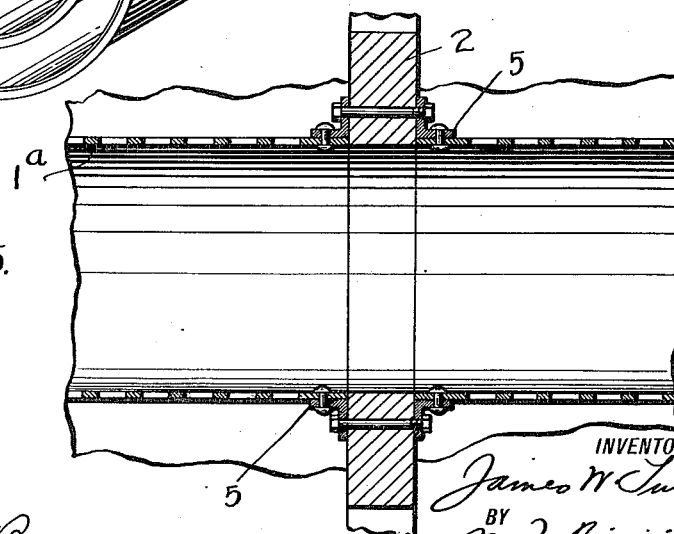
WITNESSES
INVENTOR
James W Tuttle
BY
ATTORNEY

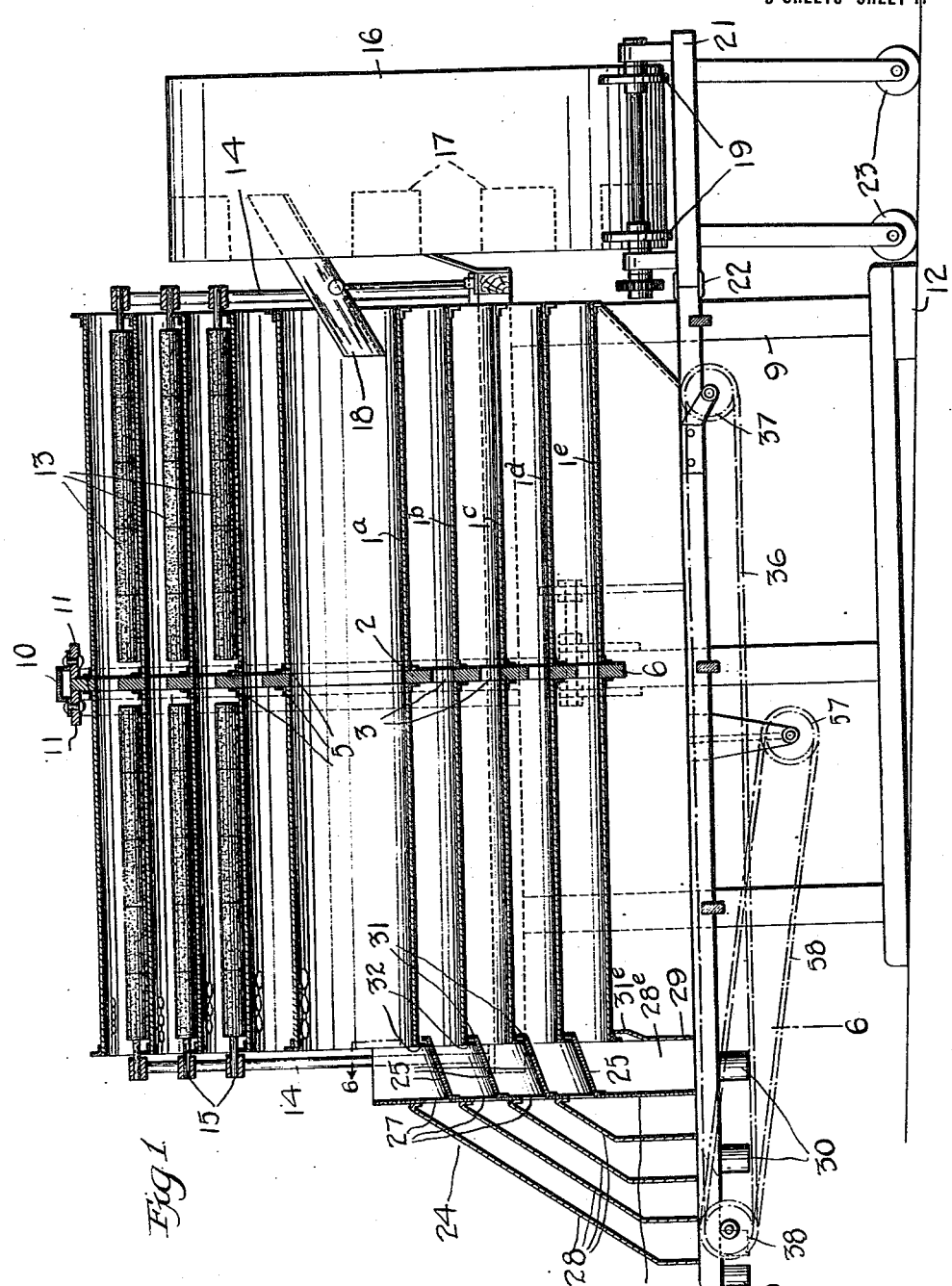

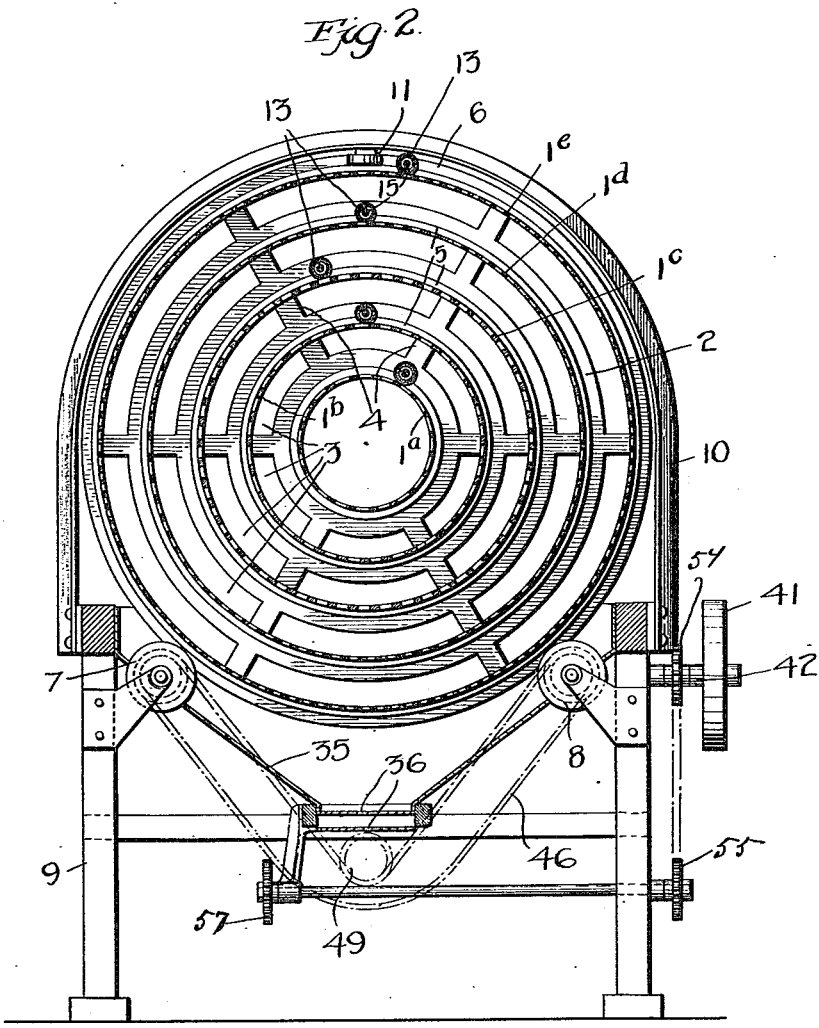

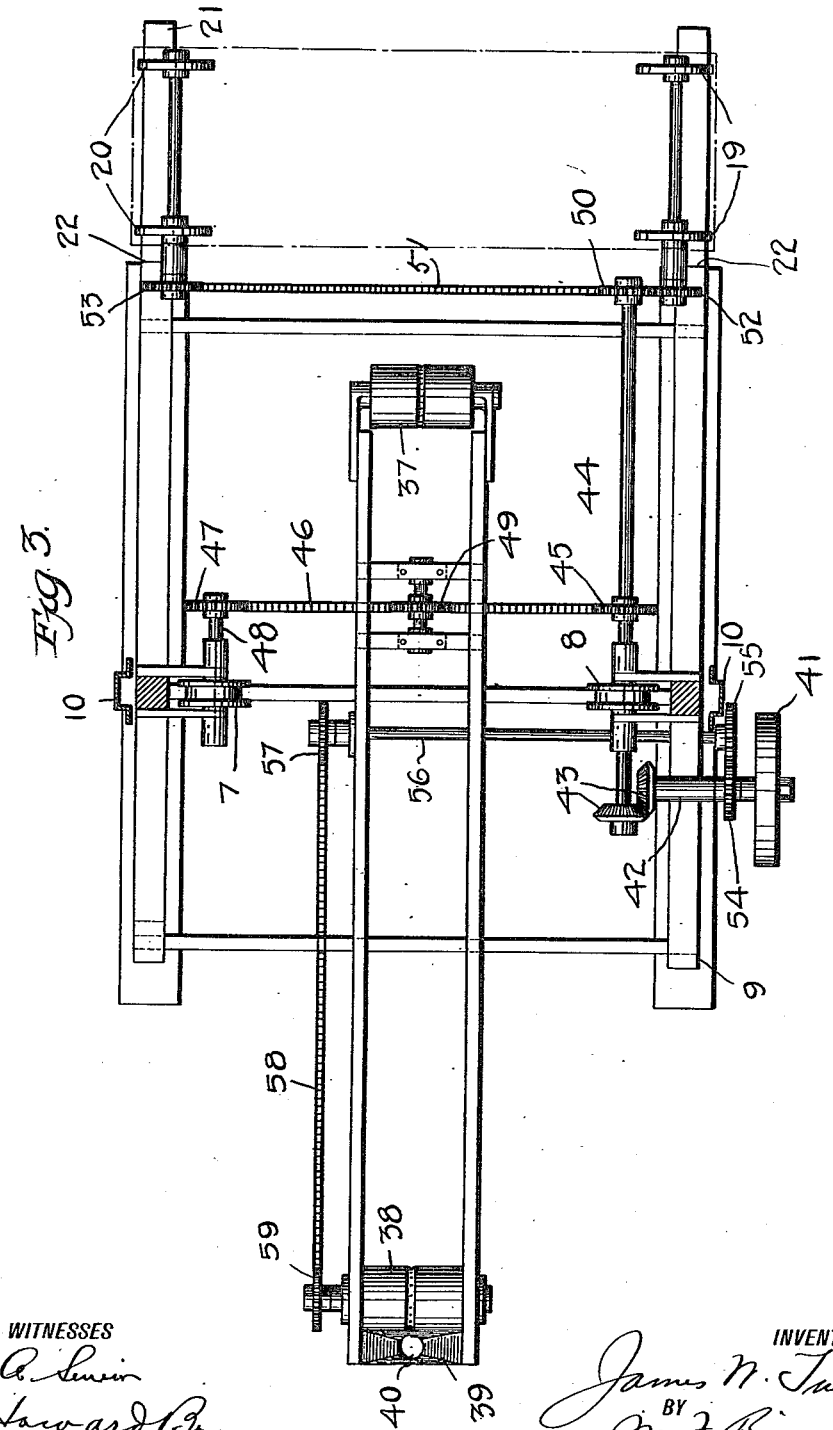

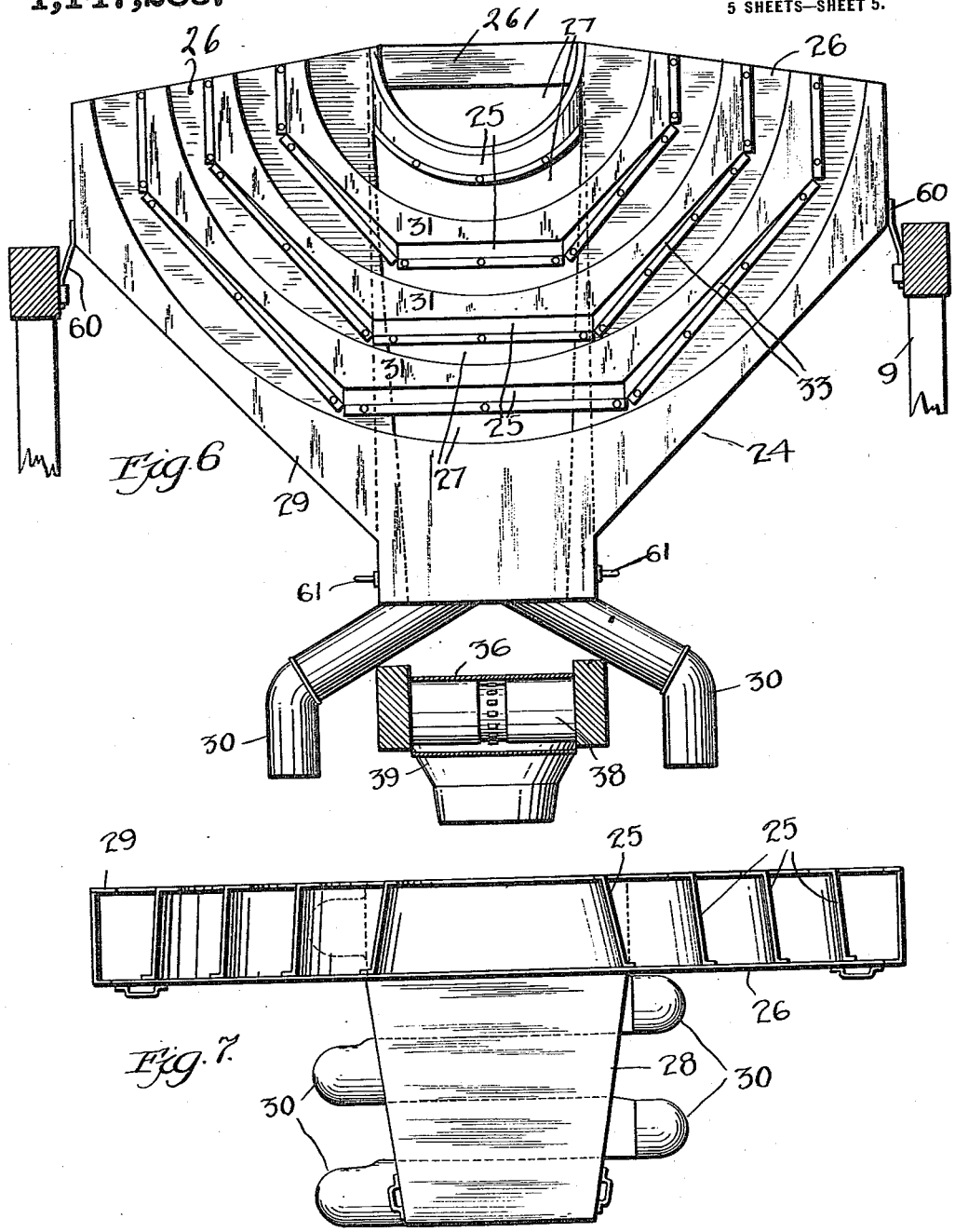

UNITED STATES PATENT OFFICE.

JAMES W. TUTTLE, OF BALTIMORE, MARYLAND, ASSIGNOR TO SINCLAIR-SCOTT COMPANY, OF BALTIMORE, MARYLAND, A CORPORATION OF MARYLAND.

PEA-GRADER.

1,147,283. Specification of Letters Patent. Patented July 20, 1915.

Application filed December 29, 1914. Serial No. 879,517.

*To all whom it may concern:*

Be it known that I, JAMES W. TUTTLE, a citizen of the United States, residing in Baltimore, State of Maryland, have invented certain new and useful Improvements in Pea-Graders, of which the following is a specification.

The object of my invention is to devise a grader, for use in canning factories, in which the mass of shelled peas containing berries of various sizes is assorted into several masses, each of which contains pea berries of about the same size, and to devise a grader of proportions adequate to do the work on the scale and with the degree of accuracy required. Excepting for a small number of such graders as operate on the reciprocating or shaking principle, the apparatus now almost exclusively used in this country is built in accordance with the patent of Scott and Chisholm, No. 608,230, and consists of a series of axially-alined rotating zinc cylinders, each provided with perforations of a given size and the sizes of the perforations in the several rotating cylinders gradually varying from small in the first to large in the last cylinder. The objections to this grader are its great length, requiring great floor space, and the necessity of sifting out the small peas first while these are still mixed in the whole mass. Small peas do not get through the sieve well at best and when mixed with the larger sizes, which latter tend to cover the sieve-perforations, it happens that many small peas do not get through the first sieve and that they pass into succeeding sieves to be ultimately mixed with larger pea sizes. This interferes with accurate grading and reduces the number of the smallest peas recovered, and yet these bring a much higher price than the larger sizes. In this connection it must be stated that the pea berries, being soft, have a tendency to pass into but not through a separating aperture of a trifle smaller size, thus closing the perforations and diminishing the sifting capacity. This tendency is so marked that it is indispensable to use a continuously active clearing device to force the peas out of the holes in the rotating cylinder. In the Scott and Chisholm apparatus, a longitudinal roller, whose axis is stationary, resting against the outside of the rotating cylinder near its top, forces the imprisoned peas inward to clear the aperture.

Various proposals have been made for telescoping or nesting the several cylinders, one inside the other. This naturally greatly diminishes the floor space required. Again, it permits the smallest, inner cylinder, into the feed end of which the mass of peas to be assorted is first passed, to have the largest sifting apertures, so that the largest peas, which are still larger than the apertures in this cylinder, are first taken out and collected at the discharge end of this inner cylinder. The mass of peas, with the largest size removed, gradually drops into the surrounding next largest cylinder with next smaller sifting apertures, and the next smaller size of peas pass along this cylinder and are gathered at its discharge end. Finally, the smallest peas pass through the sieve perforations of the largest cylinder, where they are mixed with but a single larger size. This greatly increases the accuracy of the sifting, especially for the smaller and more valuable peas as against the plan of Patent No. 608,230. But in all such proposals, there has been a complication due to supporting and driving the nested cylinders when these were separate, or else the structures were of a character which could not be successfully built and operated of a size long enough to effect complete sifting. For it is to be noticed that, with the nested cylinder construction, a certain fairly considerable length of cylinder is necessary not merely to get capacity, but to do the work at all; for the entire mass of peas is passing axially along the cylinders while the sorting is proceeding and the ends of the larger cylinders on the feed side do but little work, since they receive but few peas.

Briefly stated, I have discovered that it is practicable, despite the fact that each cylinder must be of considerable length, to inter-connect the several cylinders of the nested set at the center, into a single structure which is supported, guided and driven from the outside of the cylinders leaving the interior of the central cylinder free and unobstructed. The spaces between the connections are sufficiently large to permit a practically unobstructed passage in each cylinder for the mass of peas to be separated.

In actual practice, I take a disk, say five feet in diameter, having a series of segmental apertures to constitute the passageway for the peas, but leaving a series of connections between the segmental apertures to constitute the central perforated support for the cylinders, and I mount a set of pairs of half-cylinders, each say five feet long, on opposite sides of the disk, the two opposite half cylinders of a pair constituting a single cylinder about ten feet long, the adjacent segmental aperture in the disk constituting the central passageway for the peas in that cylinder and the metal between the segmental apertures constituting the connections for the several cylinders of varying sizes. This disk, I mount in an approximately vertical, but slightly tilted, position on rotary travelers, which cause it and the cylinders connected therewith to rotate. The clearing devices are then inserted from each end, all of which will appear in greater detail from the drawings, in which—

Figure 1 is a longitudinal section through the sifter with the feeding device in elevation; Fig. 2 is a vertical transverse section through the apparatus; Fig. 3 is a plan view of the base frame with the driving mechanism thereon; Fig. 4 is a fragmentary perspective view of the concentric sifting cylinders, with their central support and external track; Fig. 5 is an enlarged, fragmentary, longitudinal, sectional view, showing the manner of uniting the half-cylinders to the central support; Fig. 6 is a vertical section on the line 6—6 of Fig. 1, for the purpose of showing the pea-collecting and delivering structure; Fig. 7 is a plan view of this part of the apparatus; and Fig. 8 is an enlarged cross-section through one of the clearing devices.

The concentric cylinders are designated $1^a$, $1^b$, $1^c$, $1^d$, and $1^e$, respectively, $1^a$ being the innermost cylinder having the largest openings and $1^e$ the outermost cylinder with the smallest openings, the other cylinders varying in size and apertures in the order given. The disk 2, constituting the central support for the cylinders, is formed with concentric series of segmental openings 3, between which are the connecting portions 4. As more particularly shown in Figs. 1 and 5, the cylinders are preferably formed of alined half sections rigidly secured to opposite sides of the disks by suitable means, such as angles 5 riveted to the cylinders and bolted through the disk, and are so formed and arranged in relation to the segmental openings 3 that their inner surfaces are substantially flush with the outer boundaries of these passageways. By such a construction the concentric cylinders are united into a firm, rotary structure, and the longitudinal travel of the peas is substantially unimpeded.

The circumferential portion of the disk 2 projects beyond the outside cylinder, forming in effect an annular track 6, which manifestly, though with less advantage, might be of a separate piece. By means of this track the rotary sifting structure is supported on a pair of travelers or grooved rollers 7 and 8, suitably mounted on a base frame 9 of appropriate construction. A central superstructure frame 10, which is united to the base frame and may be made of channeled iron as shown, arches over the cylinder structure and serves as a support for rollers 11, or other suitable anti-friction devices, which guide the upper portion of the track and thereby keep the structure from tilting.

In use the cylinders are disposed at a slight inclination, as shown in Fig. 1, this being conveniently accomplished by placing a block 12 beneath the rear portion of the base frame. From the outer ends of the cylinders are supported clearing devices 13, which project inward over the tops of cylinders into proximity with the central disk 2. As shown in Fig. 2, these devices are preferably in staggered relation. The supports for the clearing devices consist of end frames 14, mounted on suitable portions of the base frame and bearing inward-projecting mandrels 15, on which the clearing rollers are rotatably supported. As more particularly shown in Figs. 1 and 8, the said rollers are each formed in a plurality of individual sections, the openings in which are materially larger than the mandrel, so that the sections may have individual eccentric movement, thereby increasing their effectiveness and reducing the danger of crushing the imprisoned peas. At the upper or entrance ends of the cylinders is a feeding device 16, the construction of which may be varied. In the particular instance shown, it consists of a rotary drum, which is likewise slightly tilted and is provided at the side adjacent the cylinders with internal buckets 17. These elevate the peas placed in the drum and deposit them in a chute 18 mounted on the supporting frame of the cylinders and delivering into the end of the smallest cylinder $1^a$. The feeding drum is mounted on pairs of supporting and driving rollers 19 and 20 journaled on a frame 21, and in order to permit free access to the ends of the cylinders, for cleaning, this frame is made separable from the cylinder structure frame, being preferably connectible therewith, as indicated at 22, and having wheels 23 facilitating its removal and replacement.

At the outer ends of the cylinders is a collecting and delivery structure designated generally by the reference character 24. This structure receives and delivers the peas which fail to pass through the sifting openings in the respective cylinders, and, like the feeding device, is removable from the cylinders for cleaning purposes. It comprises a base plate 26 with a central aperture 27 or, what amounts to the same thing, two side plates 26 cross connected but spaced apart to form an aperture 27, the difference being one of description and not of structure. To one face of this base plate 26 and on opposite sides thereof are secured a nest of segmental collecting troughs 25 which are open at the back and at the top and which pass across the aperture 27 at their lowest point. These troughs are disposed one within another and extend up on the sides of the cylinders at the discharge ends thereof. Extending from and secured to the opposite face of the base plate or plates 26 and through the aperture 27 are a series of suitable sheet metal walls forming discharge chutes 28, each wall being connected to the bottom of a segmental trough in the region where this crosses the aperture 27. The set of discharge chutes thus formed is narrower than the nest of collecting troughs. These chutes 28 terminate in laterally extended spouts 30, which are arranged in two spaced longitudinal series. It will be furthermore noticed that I make the bottoms of the outer troughs 26 straight across or on a less curve than the sides.

The troughs 25 and the chutes 28, into which they deliver, serve the cylinders 1ª, 1ᵇ, 1ᶜ and 1ᵈ. The peas passing from the end of the outermost cylinder 1ᵉ are received by a chute 28ᵉ, which is formed between the wall 26 and a back wall 29. This chute also terminates in one of the spouts 30. The rear edges of the troughs 25 are provided with flanges 31, which project upward in rear of angle-iron flanges 32 on the ends of the cylinders, so as to prevent escape of peas. The wall 29 is likewise provided with a lip or flange 31ᵉ for similar coöperation with a flange on the larger cylinder 1ᵉ. As shown in Fig. 6, the uppermost or smallest trough 25 may be formed on a circular arc, but the larger troughs preferably have angularly formed walls 33, in order to insure the delivery of peas to the openings 27. This is because walls formed on the arcs of larger circles would be liable to permit the peas to pile up and choke.

The peas which pass through the openings of the outermost cylinder are received in a trough 35, the bottom of which is formed by an apron 36, which passes over a roller 37 near the rear end of the sifter frame and extends forward to a roller 38 on a forward extension of the frame. The apron as thus disposed passes in intermediate relation to the two sets of laterally spaced spouts 30 and delivers to a hopper 39 and spout 40 carried by the frame extension beyond the other spouts.

Power is received for driving the machine by a pulley 41 fast on a shaft 42, which, through bevel gears 43, drives a longitudinal countershaft 44. The said shaft 44 bears the traveler 8 and also a sprocket wheel 45, from which a chain 46 drives a sprocket 47 secured to the shaft 48 of the other traveler 7. At an intermediate point this sprocket passes in engagement with an idler 49, located centrally below the sifting cylinders. The shaft 44 extends to the feeding end of the sifting frame, and is there provided with a sprocket wheel 50, which, by means of a chain 51, drives sprockets 52 and 53 on the shafts of the feed cylinder rollers 19 and 20. A sprocket wheel 54 on the shaft 42 connects with a sprocket 55 on a cross-shaft 56, which carries a sprocket wheel 57 to drive the apron 36, being for this purpose connected by a chain 58 with a sprocket wheel 59 on the journal extension of the roller 38. The removable collecting and delivery structure 24 may be supported on the frame by suitable brackets, as indicated at 60 in Fig. 6, and its removal facilitated by the provision of appropriate handles 61. The purpose of staggering the clearing devices 13 is to prevent a pea berry which is pressed out of an aperture in one cylinder from falling immediately in front of a clearing device on the next cylinder and thus being crushed.

What is claimed as new is:

1. A green pea grader comprising a disk having segmental apertures concentric one with the other, and sifting cylinders mounted one within the other on opposite sides of the disk in respective alinement with the several apertures, substantially as described.

2. A green pea grader comprising a set of open-ended sifting cylinders disposed one within the other and having a central support rigidly connecting them, an external circular track surrounding and secured to the cylinders at their center, and a rotary support for the external track, substantially as described.

3. A green pea grader comprising a disk having concentric segmental apertures and an external circular track, a set of concentric sifting cylinders supported on opposite sides of the disk, and travelers for rotatably supporting the track and structure, substantially as described.

4. A green pea grader comprising a disk having concentric segmental apertures and an external circular track, a set of concentric sifting cylinders supported on opposite sides of the disk, travelers on which the track rests below, and a pair of guide rollers above for holding the structure against displacement, substantially as described.

5. A green pea grader comprising a set of open-ended concentric sifting cylinders having a central support rigidly connecting them, an external circular track surrounding and secured to the cylinders at their center, a rotating support for the external track, and sets of clearing devices projecting into the open-ended sifting cylinders from each end, substantially as described.

6. A green pea grader comprising a set of concentric sifting cylinders, the outermost cylinder having the finest perforations, collecting devices at the discharge ends of the several cylinders to receive from each the peas which fail to pass through the openings thereof, a longitudinal trough below the outer cylinder, and a single longitudinally movable apron in the bottom of said trough beneath said outermost cylinder for collecting only the smallest peas namely those which pass through the openings of said outer cylinder, the delivery end of said apron conducting the smallest peas to the discharge end of the outermost cylinder.

7. A green pea grader comprising a set of concentric sifting cylinders having outwardly projecting flanges at their discharge ends, a connected set of segmental collecting troughs mounted in juxtaposition to the discharge ends of the several cylinders, said trough having flanges which project upward behind the flanges on the cylinders, and discharge chutes respectively connecting with the several troughs, substantially as described.

8. A green pea grader comprising a set of concentric sifting cylinders, an apertured plate at one end thereof, segmental collecting troughs secured to said plate at one side and juxtaposed to the discharge ends of the cylinders, and discharge chutes also secured to said plate and extending from the opposite side thereof and connecting with the troughs through the aperture, substantially as described.

9. A green pea grader comprising a set of concentric sifting cylinders, a nest of segmental collecting troughs, one within another, mounted in justaposition to the discharge ends of the several cylinders and extending up on the sides thereof, a plate uniting said troughs and forming a front wall therefor, said plate being open down the middle to permit the escape of peas from the troughs, and discharge chutes also united to said plate and connecting severally with the troughs through the open portion of the plate.

10. A green pea grader comprising a set of concentric sifting cylinders, in combination with a nest of segmental collecting troughs, one within the other, mounted in juxtaposition to the discharge ends of the several cylinders and extending up on the sides thereof, and a set of discharge chutes in front of and narrower than the nest of segmental troughs with which the chutes communicate, said troughs and chutes being united together and removable from the cylinders.

11. A green pea grader comprising a set of concentric sifting cylinders, means for receiving and delivering the peas from the discharge ends of the several cylinders, said means terminating in separate discharge spouts arranged in two laterally spaced sets, and a conveyer for receiving the peas passing through the openings of the largest cylinder, said conveyer extending longitudinally in intermediate relation to said discharge spouts, substantially as described.

12. A green pea grader comprising a set of concentric sifting cylinders, means for receiving and delivering the peas from the discharge ends of the several cylinders, said means terminating in separate discharge spouts arranged in two laterally spaced sets, and a conveyer for receiving the peas passing through the openings of the largest cylinder, said conveyer extending longitudinally in intermediate relation to said discharge spouts and delivering to a spout at the remote end of the sets of lateral spouts, substantially as described.

13. A green pea grader comprising a base frame, a set of concentric sifting cylinders having a central support rigidly connecting them, an external circular track surrounding and secured to the cylinders at their center, rollers for supporting the track on the base frame, a superstructure frame mounted on the base frame and extending over the set of cylinders, and rollers on said superstructure frame engaging the track and holding the cylinder structure against displacement, substantially as described.

14. A green pea grader comprising a base frame, a set of concentric sifting cylinders having a central support rigidly connecting them, an external circular track surrounding and secured to the cylinders at their center, rollers for supporting the track on the base frame, a superstructure frame mounted ter, rollers for supporting the track on the set of cylinders, rollers on said superstructure frame engaging the track and holding the cylinder structure against displacement, end frames rising from the base frame, and sets of clearing devices projecting into the sifting cylinders from said end frames, substantially as described.

15. A green pea grader comprising a set of concentric sifting cylinders having a central support rigidly connecting them, an external circular track surrounding and secured to the cylinders at their center, a rotating support for the external track, and sets of clearing devices projecting into the sifting cylinders from each end, said clearing devices comprising supporting mandrels and rollers mounted on said mandrels and consisting of independent sections having openings substantially larger than the mandrels and capable of individual eccentric movement thereon, substantially as described.

16. A green pea grader comprising a base frame, travelers thereon, a set of concentric sifting cylinders having a central connecting support and a central external track bearing on said travelers, a longitudinal shaft bearing one of said travelers and a sprocket, a sprocket on the other traveler, an intermediate idler beneath the cylinders, means for driving the longitudinal shaft, and a chain passing around said sprockets and in engagement with said idler, substantially as described.

17. A green pea grader comprising a base frame, travelers thereon, a set of concentric sifting cylinders having a central connecting support and a central external track bearing on said travelers, a longitudinal shaft bearing one of said travelers and a sprocket, a sprocket on the other traveler, an intermediate idler beneath the cylinders, means for driving the longitudinal shaft, a chain passing around said sprockets and in engagement with said idler, a feeding device at one end of the cylinders, and means for driving said feeding device from said longitudinal shaft, substantially as described.

18. A green pea grader, comprising a set of concentric sifting cylinders having a central support, and sets of clearing devices projecting over the several cylinders from their opposite ends, said clearing devices being in staggered relation, substantially as described.

In testimony whereof, I have signed my name to this specification, in the presence of two subscribing witnesses.

JAMES W. TUTTLE.

Witnesses:
FREDERICK W. GEISS,
MAUD V. ROBERTS.